United States Patent
Shaffer et al.

(10) Patent No.: US 8,155,619 B2
(45) Date of Patent: Apr. 10, 2012

(54) INTEROPERABILITY AND COLLABORATION SYSTEM WITH EMERGENCY INTERCEPTION MONITORING

(75) Inventors: Shmuel Shaffer, Palo Alto, CA (US); Amit Barave, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 647 days.

(21) Appl. No.: 11/756,827

(22) Filed: Jun. 1, 2007

(65) Prior Publication Data
US 2008/0299940 A1 Dec. 4, 2008

(51) Int. Cl.
H04M 11/04 (2006.01)
(52) U.S. Cl. ............. 455/404.2; 370/260; 370/266; 370/276; 370/328; 370/338
(58) Field of Classification Search ............ 455/404.2
See application file for complete search history.

(56) References Cited

U.S. PATENT DOCUMENTS

| | | | | |
|---|---|---|---|---|
| 4,931,780 A * | 6/1990 | LaMont et al. | ............. | 340/691.6 |
| 5,387,905 A * | 2/1995 | Grube et al. | ............. | 340/825.52 |
| 5,471,646 A * | 11/1995 | Schultz | ............. | 455/519 |
| 5,515,043 A * | 5/1996 | Berard et al. | ............. | 340/988 |
| 5,754,960 A * | 5/1998 | Downs et al. | ............. | 455/508 |
| 5,960,337 A * | 9/1999 | Brewster et al. | ............. | 455/404.2 |
| 6,002,941 A * | 12/1999 | Ablay et al. | ............. | 455/518 |
| 6,204,844 B1 * | 3/2001 | Fumarolo et al. | ............. | 715/736 |
| 6,246,752 B1 * | 6/2001 | Bscheider et al. | ............. | 379/88.22 |
| 6,249,570 B1 * | 6/2001 | Glowny et al. | ............. | 379/88.22 |
| 6,252,946 B1 * | 6/2001 | Glowny et al. | ............. | 379/88.22 |
| 6,252,947 B1 * | 6/2001 | Diamond et al. | ............. | 379/88.22 |
| 6,327,342 B1 * | 12/2001 | Mobley et al. | ............. | 379/45 |
| 6,366,782 B1 * | 4/2002 | Fumarolo et al. | ............. | 455/457 |
| 6,421,009 B2 * | 7/2002 | Suprunov | ............. | 342/465 |
| 6,477,387 B1 * | 11/2002 | Jackson et al. | ............. | 455/519 |
| 6,545,606 B2 * | 4/2003 | Piri et al. | ............. | 340/573.1 |
| 6,687,504 B1 * | 2/2004 | Raith | ............. | 455/456.1 |
| 6,711,247 B1 * | 3/2004 | Needham et al. | ............. | 379/207.14 |
| 6,728,345 B2 * | 4/2004 | Glowny et al. | ............. | 379/88.22 |
| 6,785,369 B2 * | 8/2004 | Diamond et al. | ............. | 379/88.22 |
| 6,785,370 B2 * | 8/2004 | Glowny et al. | ............. | 379/88.22 |
| 6,799,049 B1 * | 9/2004 | Zellner et al. | ............. | 455/456.1 |
| 6,865,185 B1 * | 3/2005 | Patel et al. | ............. | 370/412 |
| 6,865,460 B2 * | 3/2005 | Bray et al. | ............. | 701/36 |
| 6,882,856 B1 * | 4/2005 | Alterman et al. | ............. | 455/519 |
| 6,937,706 B2 * | 8/2005 | Bscheider et al. | ............. | 379/88.22 |
| 6,965,816 B2 * | 11/2005 | Walker | ............. | 701/16 |

(Continued)

FOREIGN PATENT DOCUMENTS
EP 0967820 A 12/1999

*Primary Examiner* — Yuwen Pan
*Assistant Examiner* — Hai Nguyen
(74) *Attorney, Agent, or Firm* — P. Su

(57) ABSTRACT

Methods and apparatus for automatically connecting an emergency caller with appropriate responders within an interoperability and collaboration system. According to one aspect of the present invention, a method includes obtaining a request for a response, and identifying a first location from which the request originated. The request is obtained from a source that utilizes a phone and is located at the first location. The method also includes identifying at least one potential responder that may be capable or appropriate for providing the response. Finally, the method also includes creating a virtual talk group that includes the source and the potential responder. The potential responder may listen substantially directly to communications from the source within the virtual talk group using a land mobile radio.

26 Claims, 5 Drawing Sheets

U.S. PATENT DOCUMENTS

| | | | | |
|---|---|---|---|---|
| 7,031,700 | B1 | 4/2006 | Weaver et al. | |
| 7,058,385 | B2* | 6/2006 | Lauper | 455/404.1 |
| 7,069,016 | B2* | 6/2006 | Crisler et al. | 455/453 |
| 7,124,188 | B2* | 10/2006 | Mangipudi et al. | 709/226 |
| 7,148,797 | B2* | 12/2006 | Albert | 340/521 |
| 7,251,470 | B2* | 7/2007 | Faucher et al. | 455/404.1 |
| 7,321,926 | B1* | 1/2008 | Zhang et al. | 709/220 |
| 7,395,204 | B2* | 7/2008 | VanderBaan et al. | 704/235 |
| 7,406,710 | B1* | 7/2008 | Zellner et al. | 726/14 |
| 7,440,442 | B2* | 10/2008 | Grabelsky et al. | 370/352 |
| 7,472,412 | B2* | 12/2008 | Wolf et al. | 726/6 |
| 7,580,706 | B2* | 8/2009 | Koren et al. | 455/426.1 |
| 7,584,262 | B1* | 9/2009 | Wang et al. | 709/217 |
| 7,616,936 | B2* | 11/2009 | Shaffer et al. | 455/283 |
| 7,633,914 | B2* | 12/2009 | Shaffer et al. | 370/338 |
| 7,636,339 | B2* | 12/2009 | Shaffer et al. | 370/338 |
| 7,639,634 | B2* | 12/2009 | Shaffer et al. | 370/266 |
| 7,668,925 | B1* | 2/2010 | Liao et al. | 709/212 |
| 7,702,081 | B1* | 4/2010 | Klesper et al. | 379/45 |
| 7,706,339 | B2* | 4/2010 | Shaffer et al. | 370/338 |
| 7,711,375 | B2* | 5/2010 | Liu | 455/456.1 |
| 7,711,820 | B2* | 5/2010 | Sharma et al. | 709/226 |
| 7,751,348 | B2* | 7/2010 | Shaffer et al. | 370/260 |
| 7,764,973 | B2* | 7/2010 | Shaffer et al. | 455/520 |
| 7,792,899 | B2* | 9/2010 | Shaffer et al. | 709/204 |
| 7,809,390 | B2* | 10/2010 | Shaffer et al. | 455/518 |
| 7,813,750 | B2* | 10/2010 | Hobby et al. | 455/521 |
| 7,831,270 | B2* | 11/2010 | Kalley et al. | 455/518 |
| 7,836,177 | B2* | 11/2010 | Kasriel et al. | 709/224 |
| 7,840,514 | B2* | 11/2010 | Keith, Jr. | 706/47 |
| 7,860,070 | B2* | 12/2010 | Shaffer et al. | 370/338 |
| 7,869,361 | B2* | 1/2011 | Balay et al. | 370/233 |
| 7,869,386 | B2* | 1/2011 | Shaffer et al. | 370/260 |
| 7,873,345 | B1* | 1/2011 | Dunne et al. | 455/404.1 |
| 7,885,674 | B2* | 2/2011 | Shaffer et al. | 455/518 |
| 8,014,324 | B2* | 9/2011 | Oliveira et al. | 370/278 |
| 2001/0040942 | A1* | 11/2001 | Glowny et al. | 379/88.22 |
| 2001/0043685 | A1* | 11/2001 | Bscheider et al. | 379/88.22 |
| 2001/0055372 | A1* | 12/2001 | Glowny et al. | 379/88.22 |
| 2002/0035616 | A1* | 3/2002 | Diamond et al. | 709/219 |
| 2002/0077075 | A1* | 6/2002 | Ikonen et al. | 455/404 |
| 2002/0086659 | A1* | 7/2002 | Lauper | 455/404 |
| 2002/0102961 | A1* | 8/2002 | Gibbons et al. | 455/404 |
| 2003/0093187 | A1* | 5/2003 | Walker | 701/1 |
| 2004/0029558 | A1* | 2/2004 | Liu | 455/404.2 |
| 2004/0121782 | A1* | 6/2004 | Tester | 455/456.1 |
| 2004/0259581 | A1* | 12/2004 | Crisler et al. | 455/519 |
| 2004/0266390 | A1* | 12/2004 | Faucher et al. | 455/404.1 |
| 2005/0162306 | A1* | 7/2005 | Babitch et al. | 342/357.05 |
| 2005/0187677 | A1* | 8/2005 | Walker | 701/16 |
| 2005/0239436 | A1* | 10/2005 | Bell et al. | 455/404.2 |
| 2005/0282518 | A1* | 12/2005 | D'Evelyn et al. | 455/404.1 |
| 2006/0046697 | A1* | 3/2006 | Koren et al. | 455/412.2 |
| 2006/0080344 | A1* | 4/2006 | McKibben et al. | 707/100 |
| 2006/0114941 | A1* | 6/2006 | Silverman et al. | 370/503 |
| 2006/0120516 | A1* | 6/2006 | Armbruster et al. | 379/37 |
| 2006/0171520 | A1* | 8/2006 | Kliger | 379/218.01 |
| 2006/0183460 | A1* | 8/2006 | Srinivasan et al. | 455/410 |
| 2006/0208888 | A1 | 9/2006 | Patel et al. | |
| 2006/0224797 | A1 | 10/2006 | Parish et al. | |
| 2007/0004389 | A1* | 1/2007 | Wallace et al. | 455/415 |
| 2007/0036100 | A1* | 2/2007 | Shaffer et al. | 370/328 |
| 2007/0036118 | A1* | 2/2007 | Shaffer et al. | 370/338 |
| 2007/0037596 | A1* | 2/2007 | Shaffer et al. | 455/518 |
| 2007/0047479 | A1* | 3/2007 | Shaffer et al. | 370/328 |
| 2007/0088836 | A1* | 4/2007 | Tai et al. | 709/227 |
| 2007/0092070 | A1 | 4/2007 | Croy et al. | |
| 2007/0104121 | A1* | 5/2007 | Shaffer et al. | 370/276 |
| 2007/0105578 | A1* | 5/2007 | Shaffer et al. | 455/518 |
| 2007/0105579 | A1* | 5/2007 | Shaffer et al. | 455/519 |
| 2007/0123271 | A1* | 5/2007 | Dickinson | 455/456.1 |
| 2007/0159354 | A1* | 7/2007 | Rosenberg | 340/902 |
| 2007/0180140 | A1* | 8/2007 | Welch et al. | 709/238 |
| 2007/0201376 | A1* | 8/2007 | Marshall-Wilson | 370/252 |
| 2007/0202907 | A1* | 8/2007 | Shaffer et al. | 455/518 |
| 2007/0202908 | A1* | 8/2007 | Shaffer et al. | 455/518 |
| 2007/0226310 | A1* | 9/2007 | Shaffer et al. | 709/207 |
| 2007/0229274 | A1 | 10/2007 | Patel et al. | |
| 2007/0229350 | A1* | 10/2007 | Scalisi et al. | 342/350 |
| 2007/0232293 | A1* | 10/2007 | Goldman et al. | 455/426.1 |
| 2007/0239824 | A1* | 10/2007 | Shaffer et al. | 709/204 |
| 2007/0270172 | A1* | 11/2007 | Kalley et al. | 455/518 |
| 2007/0280195 | A1* | 12/2007 | Shaffer et al. | 370/351 |
| 2008/0037461 | A1* | 2/2008 | Biltz et al. | 370/328 |
| 2008/0037715 | A1* | 2/2008 | Prozeniuk et al. | 379/45 |
| 2008/0071984 | A1* | 3/2008 | Araki et al. | 711/114 |
| 2008/0102869 | A1* | 5/2008 | Shaffer et al. | 455/518 |
| 2008/0153455 | A1* | 6/2008 | Lancaster | 455/405 |
| 2008/0159128 | A1* | 7/2008 | Shaffer et al. | 370/229 |
| 2008/0159490 | A1* | 7/2008 | Gaudin et al. | 379/88.16 |
| 2008/0166992 | A1* | 7/2008 | Ricordi et al. | 455/404.2 |
| 2008/0181145 | A1* | 7/2008 | Chowdhury et al. | 370/310 |
| 2008/0220765 | A1* | 9/2008 | Chu et al. | 455/422.1 |
| 2008/0220801 | A1* | 9/2008 | Hobby et al. | 455/521 |
| 2008/0242247 | A1* | 10/2008 | Shaffer et al. | 455/187.1 |
| 2008/0280637 | A1* | 11/2008 | Shaffer et al. | 455/519 |
| 2008/0299940 | A1* | 12/2008 | Shaffer et al. | 455/404.2 |
| 2008/0311894 | A1* | 12/2008 | Klein et al. | 455/414.2 |
| 2009/0041206 | A1* | 2/2009 | Hobby et al. | 379/45 |
| 2009/0054010 | A1* | 2/2009 | Shaffer et al. | 455/90.2 |
| 2009/0054098 | A1* | 2/2009 | Jorgensen | 455/519 |
| 2009/0125332 | A1* | 5/2009 | Martin | 705/3 |
| 2009/0147702 | A1* | 6/2009 | Buddhikot et al. | 370/255 |
| 2009/0168685 | A1* | 7/2009 | Olivier et al. | 370/312 |
| 2009/0215411 | A1* | 8/2009 | Tucker et al. | 455/90.2 |
| 2009/0254392 | A1* | 10/2009 | Zander | 705/7 |
| 2010/0159975 | A1* | 6/2010 | Shaffer et al. | 455/516 |
| 2010/0197333 | A1* | 8/2010 | Shaffer et al. | 455/515 |

* cited by examiner

INTEROPERABILITY AND COLLABORATION SYSTEM WITH EMERGENCY INTERCEPTION MONITORING

BACKGROUND OF THE INVENTION

Network systems that allow callers to obtain emergency assistance generally do so by allowing a dispatcher to process emergency calls from the callers. In processing emergency calls, the dispatcher may contact potential responders, such as enterprise emergency response teams (ERTs) and/or loss prevention teams (LPTs), that are appropriate for responding to the emergency calls. Typically, a dispatcher has a line of communication with a caller, and a separate communication channel with an appropriate responder. The dispatcher then communicates directly with the caller and directly with an appropriate responder to communicate information provided by the caller to the appropriate responder. The caller and the appropriate responder do not communicate directly with one another.

The dispatcher effectively serves as an intermediary between the caller and an appropriate responder such as an ERT and/or a LPT. An overall system may alert a dispatcher of an affected location, e.g., conference the dispatcher in with a caller in need of assistance, and the dispatcher may then utilize a radio device to communicate with a potential responder to essentially direct the potential responder to support the affected location.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

Figure 1A:
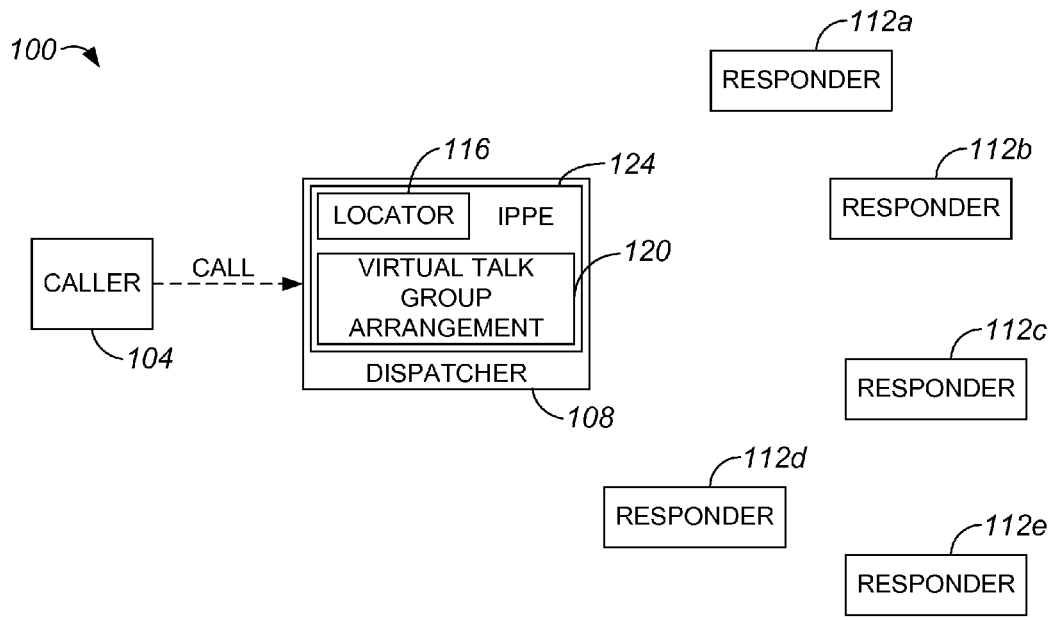
FIG. 1A is a block diagram representation of a caller initiating an E911 call in a network that supports emergency interception monitoring in accordance with an embodiment of the present invention.

In one embodiment, a method includes obtaining a request for a response, and identifying a first location from which the request originated. The request is obtained from a source that utilizes a phone and is located at the first location. The method also includes identifying at least one potential responder that may be capable or appropriate for providing the response. Finally, the method also includes creating a virtual talk group that includes the source and the potential responder. The potential responder may listen substantially directly to communications from the source within the virtual talk group using a land mobile radio.

Description

An interoperability and collaboration system such as a push-to-talk management system which creates a virtual talk group that enables callers seeking emergency response to communicate substantially directly with potential responders allows information to be communicated between the callers and the potential responders in an efficient manner. The system or, more specifically, an internet protocol policy engine (IPPE) of the system, detects an emergency request, e.g., an E911 call, identifies the location from which the emergency request originated, and identifies potential responders in the vicinity of the location. The system creates a virtual talk group that includes the source of the emergency request, a dispatcher of the system, and the potential responders. In general, the system may substantially activate the virtual talk group such that the source of the emergency request and the potential responders may directly communicate.

When a system effectively connects the mobile communications devices or radios of a dispatcher, potential responders, and a requestor of an emergency response in a virtual talk group, the potential responders may listen in on communications between the dispatcher and the requestor. Hence, the potential responders may obtain details on the evolving event as described by the requestor, and may therefore respond more efficiently than if the details had to be relayed by through the dispatcher. Further, the potential responders may communicate directly with the requestor through the virtual talk group.

An interoperability and collaboration system such as the Cisco Internet Protocol Interoperability and Collaboration System (IPICS), which is available commercially from Cisco Systems, Inc., of San Jose, Calif., facilitates coordinated, interagency response for emergencies and day-to-day operations. Interoperability and collaboration systems allow radio networks, IP networks, non-IP networks, telephones, cell phones, and computing devices to communicate. When an interoperability and collaboration system detects a request for assistance, identifies the location from which the request originated, identifies potential responders to the request, and creates a virtual talk group that allows potential responders to obtain information substantially directly from the originator of the request, the potential responders may efficiently respond to the request.

FIG. 1A is a block diagram representation of a source, as for example a caller, initiating an E911 call in a network associated with an interoperability and collaboration system that supports emergency interception monitoring in accordance with an embodiment of the present invention. A caller 104 in a network 100 makes an emergency call, e.g., an E911 call. Typically, caller 104 is at a location in which an emergency event is unfolding, and makes the emergency call through the use of a communications device such as a phone. In the described embodiment, a dispatcher arrangement 108 which includes an IPPE 124, intercepts the call from caller 104. It should be appreciated that even when IPPE 124 intercepts the call, the call may also be allowed to go through to E911. Dispatcher arrangement 108 may be a push-to-talk station that is arranged to be operated by a user.

In general, within an enterprise, a member of the enterprise may call E911 in search of assistance. An IPPE, e.g., IPPE 124, that is part of a communication system within the enterprise may intercept the call, and also allow the call to go through to E911. That is, IPPE 124 may patch a call which originated internally within the enterprise to enterprise safety and security personnel, while also enabling the call to be processed by the intended receiver of the E911 call.

Dispatcher arrangement 108 is arranged to identify potential responders from among responders 112a-e, and to create a virtual talk group that includes caller 104 and potential responders. Responders 112a-e may include, but are not limited to including, mobile security personnel, enterprise emergency response teams (ERTs) and/or loss prevention teams (LPTs). In one embodiment, dispatcher arrangement 108 may be a potential responder. A locator 116 of IPPE 124, which may include a global positioning system (GPS) locator, is arranged to determine the locations of responders 112a-e and to identify those responders 112a-e which are within a vicinity of caller 104. A virtual talk group arrangement 120 of IPPE 124 creates a suitable virtual talk group that includes potential responders and the caller 104.

Figure 1B:
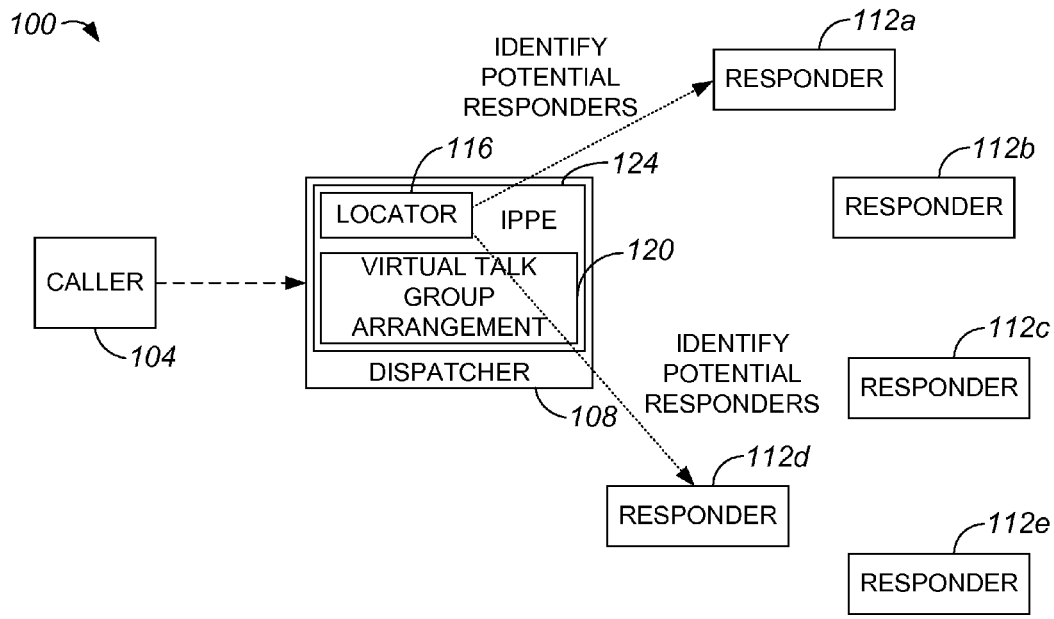
FIG. 1B is a block diagram representation of an E911 dispatcher locating potential responders within a network, i.e., network 100 of FIG. 1A, in accordance with an embodiment of the present invention.
Figure 1C:
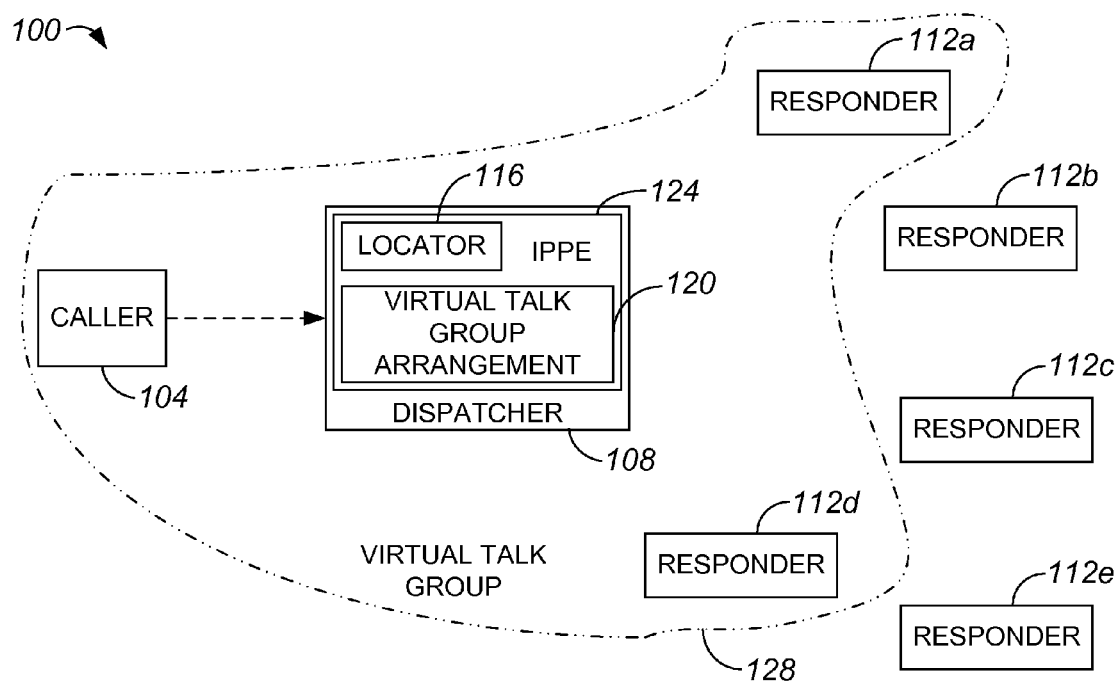
FIG. 1C is a block diagram representation of a formation of a virtual talk group formed to include potential responders within a network, i.e., network 100 of FIG. 1B, in accordance with an embodiment of the present invention.

As shown in FIG. 1B, locator 116 locates responders 112a, 112d as potential responders. Typically, potential responders 112a, 112d are those responders which are available and located in the vicinity of caller 104. That is, potential responders 112a, 112d are those responders which likely to most readily reach the location associated with caller 104. Once potential responders 112a, 112d are identified, a virtual talk group that includes potential responders 112a, 112d, caller 104, and dispatcher arrangement 108 may be formed. FIG. 1C is a block diagram representation of a virtual talk group formed to include potential responders 112a, 112d in accordance with an embodiment of the present invention. Virtual talk group arrangement 120 may define and implement a virtual talk group 128 that such that members or elements within virtual talk group 128 may communicate with each other. By way of example, responders 112a, 112d may use their radios to communicate directly with caller 104, and may also listen to exchanges that occur between caller 104 and dispatcher arrangement 108. Hence, responders 112a, 112d may efficiently obtain information that may enable them to more efficiently assist caller 104.

In one embodiment, responders 112a, 112d may have communications channels that are dedicated for use in receiving and transmitting emergency-related communications. Such communications channels may be used within virtual talk group 128 such that responders 112a, 112d may readily identify particular received transmissions as being associated with an unfolding emergency.

Figure 2:
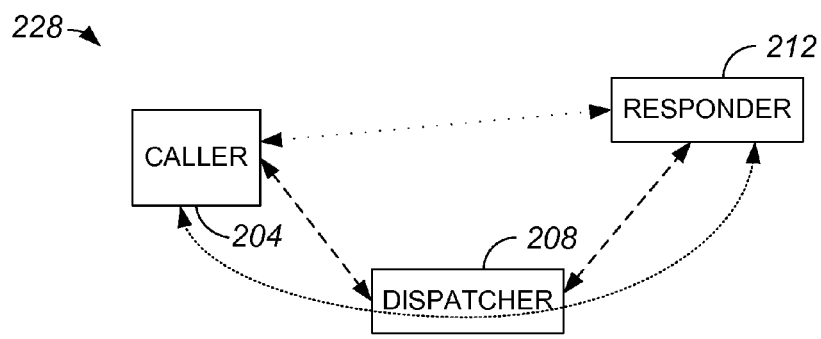
FIG. 2 is a block diagram representation of a virtual talk group in which a potential responder and a caller may communicate either directly or indirectly in accordance with an embodiment of the present invention.

FIG. 2 is a block diagram representation of a virtual talk group in which a potential responder and a caller may communicate either directly or indirectly in accordance with an embodiment of the present invention. A caller 204, a dispatcher 208, and a responder 212 who participate in a virtual talk group 228 may substantially monitor or participate in all communications. For instance, when caller 204 is exchanging information with dispatcher 208, responder 212 may listen in on the exchange. Similarly, when responder 212 communicates with dispatcher 208, caller 204 may listen in. Caller 204 and responder 212 may also communicate directly with each other such that dispatcher 208 may listen in. In other words, within virtual talk group 228, it is not necessary for dispatcher 208 to relay information from caller 204 to responder 212 and vice versa, because caller 204 and responder 212 may hear all communications, e.g., conversations, that occur within virtual talk group 228. In one example embodiment, caller 204 is communicating via a phone while responder 212 utilizes his or her land mobile radio (LMR) radio communication devices.

Figure 3:
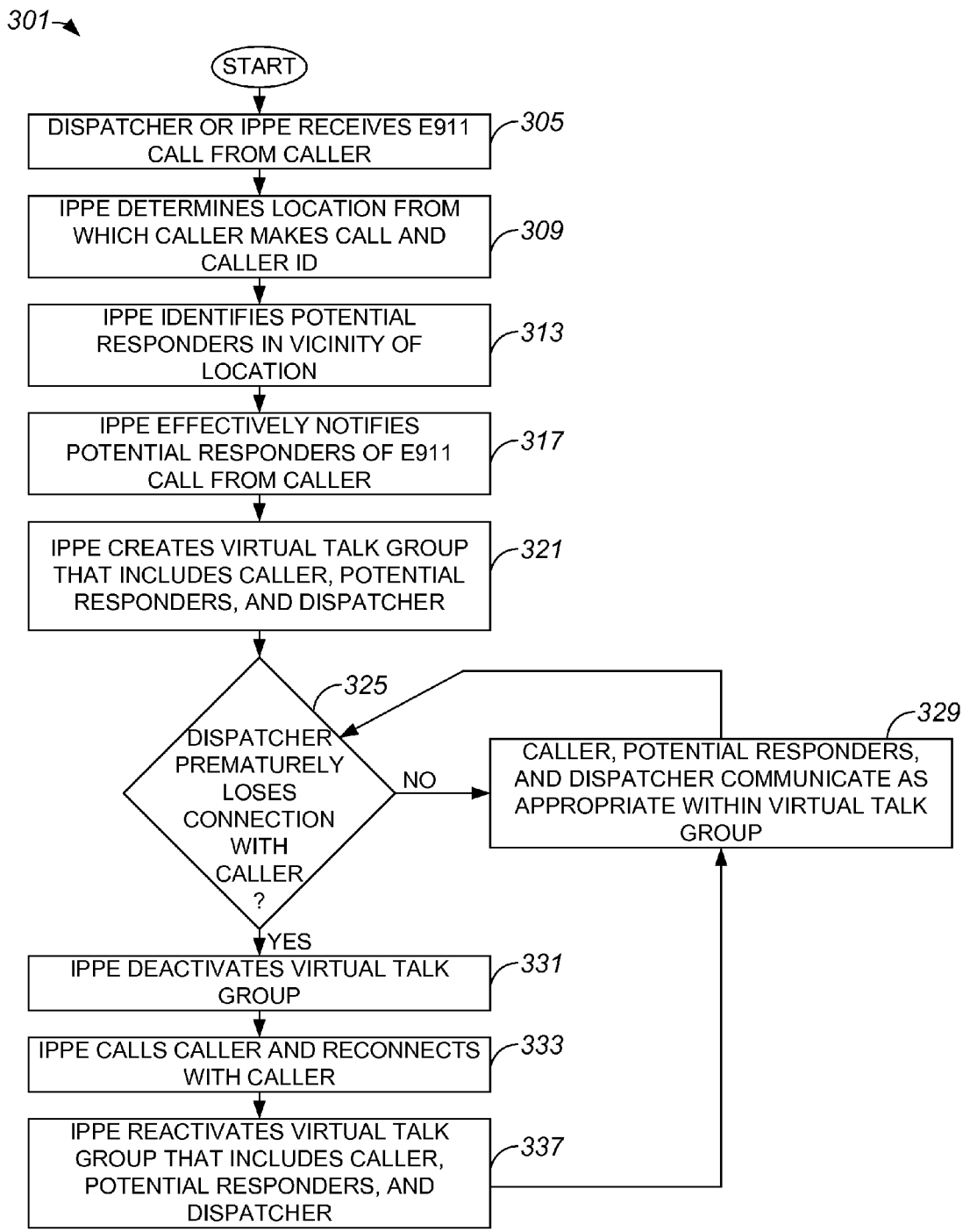
FIG. 3 is a process flow diagram which illustrates a method of processing an E911 call in accordance with an embodiment of the present invention.

FIG. 3 is a process flow diagram which illustrates a method of processing an emergency call in accordance with an embodiment of the present invention. A method 301 of processing an emergency call such as an E911 call begins at step 305 in which an E911 call is received from a caller. The caller is generally either in need of assistance, or is at a location at which assistance is needed. The dispatcher may either receive the E911 call substantially directly from the caller, or may be conferenced into the E911 call by another source, e.g., an IPPE such as IPPE 124 of FIG. 1A.

After the E911 call is received, the IPPE intercepts the call and determines the location from which the call is made, as well as a caller identifier (ID) of the caller, in step 309. In one embodiment, the location from which the call is made may be transmitted as part of the call control messages. In other example embodiments, the location information maybe transmitted as part of the media stream of the call, or as a separate stream altogether. Hence, determining the location may include identifying the location from which the call was placed. The location, which may be associated with a telephone number, may be stored by the IPPE or the dispatcher, as for example in a database, such that the dispatcher may access the location in the event that the E911 call is prematurely terminated. In another example embodiment, the location of the caller may be provided by the endpoint of the caller or by an appropriate service provider.

In step 313, the IPPE identifies potential responders that are within the vicinity of the location. It should be appreciated that potential responders that are considered as being in the vicinity of the location may vary. In other words, the definition of "vicinity" may vary depending upon the requirements of an overall system. For instance, the vicinity within which potential responders are located may be defined in terms of a radius around the location. Any ERTs and/or LPTs within the radius defined around the location may be considered to be potential responders. Alternatively, any available ERTs and/or LPTS within such a radius may be considered to be potential responders.

Once potential responders are identified, the IPPE effectively notifies or alerts potential responders of the E911 call from the caller in step 317, and hence, of a situation in which the potential responders may be of service. The steps associated with one method of notifying potential responders of an E911 call will be described below with reference to FIG. 4. After notifying the potential responders of the E911 call, the IPPE creates a virtual talk group in step 321 that includes at least the caller, the potential responders, and the dispatcher. Although the dispatcher is generally included in the virtual talk group, the dispatcher may drop out of the virtual talk group substantially at any time after the virtual talk group is formed. That is, the potential responders may communicate substantially directly with the caller. In the preferred example embodiment, the caller may utilize a regular public switched telephone network (PSTN) phone, a mobile phone, an IP phone, or substantially any other device commonly used to place phone calls, while the potential responders utilize radio communications.

A determination is made in step 325 regarding whether the dispatcher has prematurely lost communication with the caller. Such a determination may be made, in one embodiment, if the IPPE determines that the call terminated prematurely based on a disconnect cause, the IPPE dials the caller and attempts to reconnect the caller to the virtual talk group that has been established for the event. In another example embodiment, the dispatcher is able to provide an indication to the IPPE that the call has been terminated prematurely, and requests that the IPPE reconnect the caller to the virtual talk group for the specific event. If the determination is that communication has not been prematurely lost, e.g., that the connection to the caller has not been terminated before the dispatcher believes there has been a successful resolution to the call, the caller, the potential responders, and the dispatcher communicate as appropriate within the virtual talk group in step 329. That is, the caller may provide information regarding the event unfolding at his location substantially directly to the dispatcher and the potential responders. Process flow then returns to step 325 and the determination of whether the dispatcher and the potential responders have prematurely lost a connection with the caller.

If it is determined that the dispatcher and the potential responders have prematurely lost communication with the caller, process flow proceeds to step 331 in which the IPPE deactivates the virtual talk group. Then, in step 333, the IPPE places an outbound call to the caller. In one embodiment, the IPPE is able to call or otherwise access the caller to re-establish a connection using information such as the caller ID of the caller that was determined in step 309. As previously mentioned, the location information and the caller ID may be stored in a database, although it should be appreciated that the IPPE may instead capture the caller ID of the caller and use that to re-establish a connection with the caller. Once the IPPE places an outbound call to the caller and reconnects with the caller, the IPPE reactivates the virtual talk group in step 337. Process flow then returns to step 329 in which the caller, the potential responders, and the dispatcher communicate as appropriate within the virtual talk group.

Figure 4:
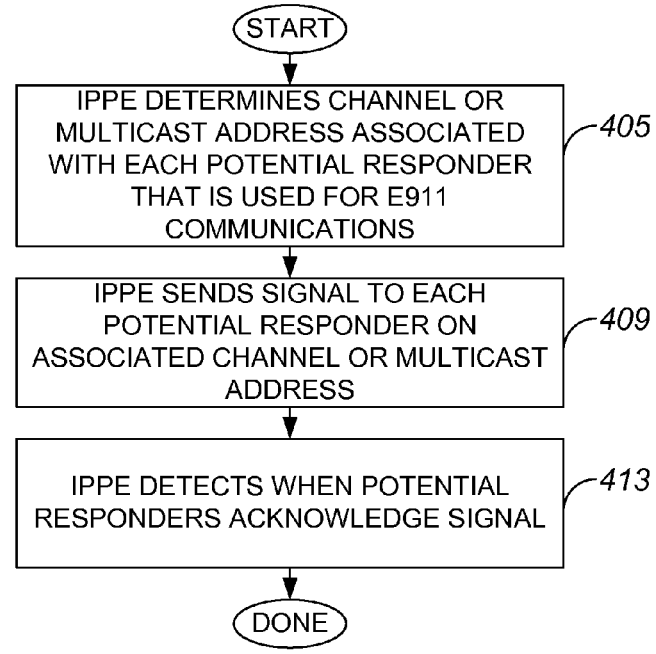
FIG. 4 is a process flow diagram which illustrates a method of notifying potential responders of an E911 call, e.g., step 317 of FIG. 3, in accordance with an embodiment of the present invention.

With reference to FIG. 4, the steps associated with one method of notifying potential responders of an E911 call to which they may respond, e.g., step 317 of FIG. 3, will be described in accordance with an embodiment of the present invention. A process 317 of notifying potential responders begins at step 405 in which an IPPE, e.g., IPPE 124 of FIG. 1A, determines the channel or multicast address associated with each potential responder. The channel or multicast address is generally a dedicated channel or multicast address at which a potential responder has reserved to receive E911 transmissions. It should be appreciated that each potential responder may reserve a different channel or multicast for use in receiving E911 transmissions. Typically, the IPPE has access to a list of channels or multicast addresses used by each potential responder.

Once the IPPE determines the channel or multicast address associated with each potential responder, the IPPE sends a signal to each potential responder on the appropriate associated channel or multicast address in step 409. In one embodiment, the signal may be an alert such as a blinking indicator that indicates to a potential responder that there is an E911 call to which the potential responder is invited to join. That is, the IPPE sends an indication to potential responders that responder for an emergency call is requested.

After the IPPE sends a signal to each potential responder, the IPPE detects in step 413 when the potential responders each acknowledge the signal. When the IPPE detects that a potential responder has acknowledged the signal, i.e., has indicated an intent to effectively join the E911 call, the IPPE may add the potential responder to a virtual talk group that includes the dispatcher and the E911 caller. The process of notifying potential responders is completed once the potential responders acknowledge an alert to effectively join an E911 call.

Figure 5:
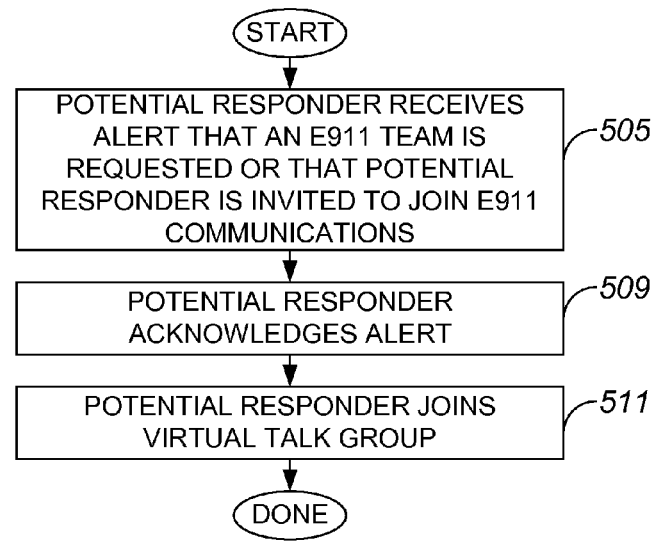
FIG. 5 is a process flow diagram which illustrates a method of becoming a part of a virtual talk group associated with an E911 call from the point of view of a responder in accordance with an embodiment of the present invention.

Referring next to FIG. 5, one process of becoming a part of a virtual talk group associated with an E911 call from the point-of-view of a responder will be described in accordance with an embodiment of the present invention. A process 501 of becoming a part of a virtual talk group associated with an E911 call begins at step 505 in which a potential responder receives an alert that an E911 or response team is requested. In one embodiment, the alert may effectively be an invitation to join E911 communications as part of a virtual talk group. An alert may be indicated, for example, as a blinking indicator on a push-to-talk management client associated with a response team. In another example embodiment, the IPPE may play an alert tone to the potential responders to alert them to the unfolding event.

After an alert is received, a potential responder may acknowledge the alert in step 509. Once the potential responder acknowledges the alert, the potential responder joins an appropriate virtual talk group in step 511, and the process of becoming a part of a virtual talk group associated with an E911 call is completed.

Figure 6:
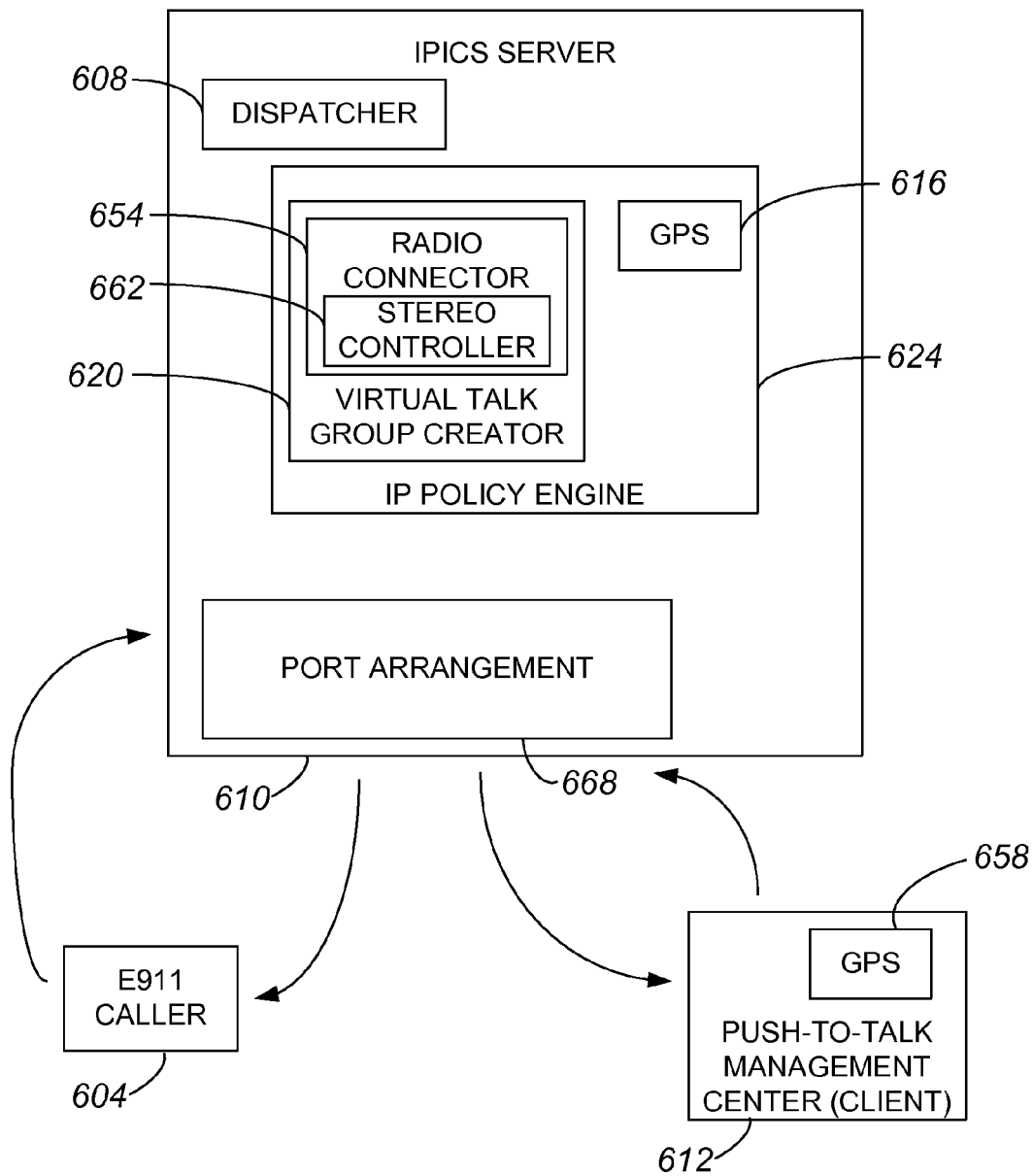
FIG. 6 is a block diagram representation of a system which includes a management center and a client in accordance with an embodiment of the present invention.

With reference to FIG. 6, an IPICS server that includes an IPPE will be described in accordance with an embodiment of the present invention. An IPICS server 610 is arranged to communicate with a clients or push-to-talk management center 612 to alert IPICS server 612 of E911 calls and to include client 612 in appropriate virtual talk groups. Communications between IPICS server 610 and client 612, as well as between IPICS server 610 and an E911 caller 604, may occur through a port arrangement 668.

An IPPE 624 of IPICS server 610 includes GPS receiving device 616 that allows IPICS server 610 to locate client 612. Specifically, a GPS transmitter 658 of client 612 may transmit location information associated with client 612 that is received on GPS receiving device 616. Using the transmitted location information, IPPE 624 may determine whether client 612 is suitable as a potential responder to E911 caller 604.

IPPE 624 also includes a virtual talk group creator 620 that is configured to create a virtual talk group that includes client 612, E911 caller 604, and a dispatcher 608 associated with IPICS server 610, if client 612 is a suitable potential responder to E911 caller 604. Virtual talk group creator 620 includes a radio connector 654 that allows the radios or communications devices of dispatcher 608, E911 caller 604, and client 612 to communicate. As previously mentioned, the communication device used by E911 caller 604 is typically a phone. In the embodiment as shown, radio connector 654 includes a stereo controller 662 that is arranged to vary the audio signals received by client 612. By way of example, when IPPE 624 detects that client 612 has accepted an invitation to join a virtual talk group, stereo controller 662 may place signals transmitted within the VTG on a relatively low priority channel of client 612. Stereo controller 662 may be arranged to place audio from a caller to E911 in a right ear, as is often associated with important communication, a left ear, or both ears. That is, stereo controller 662 may place audio into different ears as appropriate within an overall system to indicate that the audio is associated with an E911 call.

Although only a few embodiments of the present invention have been described, it should be understood that the present invention may be embodied in many other specific forms without departing from the spirit or the scope of the present invention. By way of example, any number of potential responders may generally be included in a virtual talk group. However, the number of potential responders may be limited by an IPPE such that when a predetermined number of potential responders respond to alerts or invitations to join a virtual talk group, other potential responders may be prevented from joining the virtual talk group. Alternatively, as soon as a predetermined number of potential responders indicate that they are taking ownership of an unfolding event, other potential responders may be allowed to listen in on communications in a virtual talk group, but at a lower priority. For instance, potential responders who take ownership of an unfolding event may hear conversations involving a virtual talk group on a right speaker of a push-to-talk management client, while potential responders who do not have ownership of the unfolding event may hear the conversations on a left speaker.

While it has been described that a virtual talk group includes potential responders who are within a vicinity of a requestor or E911 caller, it should be appreciated that a virtual talk group may include potential responders that are not within a predefined vicinity of the requestor. That is, substantially any responder who is accessible to an IPPE may be considered to be a potential responder. In one embodiment, the IPPE of a system may effectively create a virtual talk group that includes substantially all ERTs and/or LPTs that are associated with the system.

The steps associated with the methods of the present invention may vary widely. Steps may be added, removed, altered, combined, and reordered without departing from the spirit of the scope of the present invention. For instance, a dispatcher may deactivate a virtual talk group if it is determined that an appropriate responder has responded to an E911 call, or if a request associated with an E911 call has been otherwise accommodated. A dispatcher may also determine a type of response required by the request before identifying potential responders. Therefore, the present examples are to be considered as illustrative and not restrictive, and the invention is not to be limited to the details given herein, but may be modified within the scope of the appended claims.

What is claimed is:

1. A method comprising:
obtaining a request for a response, the request being obtained from a source that utilizes a phone to make the request;
identifying a first location from which the request originated, wherein the source is located at the first location;
identifying at least one potential responder, wherein the at least one potential responder may provide the response; and
creating a virtual talk group, the virtual talk group including the source and the at least one potential responder, wherein the at least one potential responder may listen substantially directly to communications from the source using a land mobile radio, and wherein creating the virtual talk group including the source and the at least one potential responder includes creating the virtual talk group such that the source communicates using the phone and the at least one potential responder communicates using the land mobile radio; wherein the virtual talk group is automatically created by an Internet Protocol policy engine and creating the virtual talk group includes creating the virtual talk group to include the source, the at least one potential responder, and a dispatcher.

2. The method of claim 1 wherein the at least one potential responder may listen substantially directly to communications between the source and the dispatcher.

3. The method of claim 1 wherein the source is a caller, and creating the virtual talk group includes automatically creating the virtual talk group by an Internet Protocol policy engine to include the caller, the at least one potential responder, and a dispatcher.

4. The method of claim 3 wherein the at least one potential responder may listen substantially directly to communications between the source and the dispatcher.

5. The method of claim 1 wherein identifying the at least one potential responder includes identifying a first potential responder from a plurality of potential responders, and also includes automatically identifying a second location at which the first potential responder is located and automatically determining if the second location is within a predetermined vicinity of the first location.

6. The method of claim 1 further including:
receiving an indication from the at least one potential responder that the at least one potential responder has taken ownership for providing the response; and
automatically configuring the virtual talk group to indicate that the at least one potential responder has taken ownership for providing the response, wherein an Internet Protocol policy engine automatically configures the virtual talk group.

7. The method of claim 1 wherein the source is a caller, the method further including:
maintaining a connection with the caller;
determining when the connection is prematurely terminated;
reestablishing the connection with the caller; and automatically recreating the virtual talk group to include the at least one potential responder and the source, wherein an Internet Protocol policy engine determines when the connection is prematurely terminated, reestablishes the connection with the caller, and recreates the virtual talk group.

8. The method of claim 7 wherein reestablishing the connection with the caller includes placing an outbound call to the phone.

9. The method of claim 1 wherein the first location is identified using location information transmitted as part of a media stream associated with the request.

10. Logic encoded in one or more tangible media for execution and when executed operable to:
obtain a request for a response, the request being obtained from a caller that utilizes a phone to make the request;
identify a first location from which the request originated, wherein the caller is located at the first location;
identify at least one potential responder, wherein the at least one potential responder may provide the response; and
create a virtual talk group, the virtual talk group including the caller and the at least one potential responder, wherein the at least one potential responder may listen substantially directly to communications from the caller using a land mobile radio, and wherein the logic operable to create the virtual talk group including the source and the at least one potential responder is further operable to create the virtual talk group such that the source communicates using the phone and the at least one potential responder communicates using the land mobile radio; wherein the virtual talk group is automatically created by an Internet Protocol policy engine, and the logic when executed that is operable to create the virtual talk group is further operable to create the virtual talk group to include the caller, the at least one potential responder, and a dispatcher.

11. The logic of claim 10 wherein the at least one potential responder may listen substantially directly to communications between the caller and the dispatcher.

12. The logic of claim 10 wherein the logic when executed that is operable to create the virtual talk group is further operable to create the virtual talk group using an Internet Protocol policy engine to include the caller, the at least one potential responder, and a dispatcher.

13. The logic of claim 12 wherein the at least one potential responder may listen substantially directly to communications between the caller and the dispatcher.

14. The logic of claim 10 wherein the logic when executed that is operable to identify the at least one potential responder is further operable to identify a first potential responder from a plurality of potential responders and also to identify a second location at which the first responder is located and to automatically determine if the second location is within a predetermined vicinity of the first location.

15. An apparatus comprising:
means for obtaining a request for a response, the request being obtained from a caller;
means for identifying a first location from which the request originated, wherein the caller is located at the first location;
means for identifying at least one potential responder, wherein the at least one potential responder may provide the response; and means for creating a virtual talk group, the virtual talk group including the caller and the at least one potential responder, wherein the at least one potential responder may listen substantially directly to communications from the caller, and wherein the means for creating the virtual talk group including the source and the at least one potential responder include means for creating the virtual talk group such that the source communicates using the phone and the at least one potential responder communicates using the land mobile radio; wherein the virtual talk group is automatically created by an Internet Protocol policy engine and the means for creating the virtual talk group include means for creating the virtual talk group to include the source, the at least one potential responder, and a dispatcher.

16. The apparatus of claim 15 wherein the at least one potential responder may listen substantially directly to communications between the source and the dispatcher.

17. The apparatus of claim 15 wherein the source is a caller, and the means for creating the virtual talk group includes means for automatically creating the virtual talk group by an Internet Protocol policy engine to include the caller, the at least one potential responder, and a dispatcher.

18. The apparatus of claim 17 wherein the at least one potential responder may listen substantially directly to communications between the source and the dispatcher.

19. The apparatus of claim 15 wherein the means for identifying the at least one potential responder include means for identifying a first potential responder from a plurality of potential responders, and also includes means for automatically identifying a second location at which the first potential responder is located and means for automatically determining if the second location is within a predetermined vicinity of the first location.

20. The apparatus of claim 15 further including: means for receiving an indication from the at least one potential responder that the at least one potential responder has taken ownership for providing the response; and
means for automatically configuring the virtual talk group to indicate that the at least one potential responder has taken ownership for providing the response, wherein an Internet Protocol policy engine automatically configures the virtual talk group.

21. The apparatus of claim 15 wherein the source is a caller, the apparatus further including:
means for maintaining a connection with the caller;
means for determining when the connection is prematurely terminated;
means for reestablishing the connection with the caller; and
means for automatically recreating the virtual talk group to include the at least one potential responder and the source, wherein an Internet Protocol policy engine determines when the connection is prematurely terminated, reestablishes the connection with the caller, and recreates the virtual talk group.

22. An apparatus comprising:
a port, the port being arranged to obtain communications from a caller, wherein the communications indicate a request for a response; and
an Internet Protocol policy engine, the Internet Protocol policy engine including a virtual talk group creator that is arranged to identify at least one potential responder that may provide the response and to create a virtual talk group that includes the caller and the at least one potential responder such that the at least one potential responder may listen to the communications obtained from the caller, wherein the caller communicates using the phone and the at least one potential responder listens to the communications obtained from the caller using the land mobile radio; wherein the Internet Protocol engine includes a radio connector, the radio connector being arranged to communicably connect a first phone associated with the caller, a first radio associated with the at least one potential responder, and a second radio associated with a dispatcher such that the at least one potential responder may listen to the communications from the caller and communicate substantially directly with the caller.

23. The apparatus of claim 22 wherein the Internet Protocol policy engine includes a locator, the locator being arranged to identify the at least one potential responder by identifying a location associated with the caller and determining if the at least one potential responder is within a predetermined vicinity around the location.

24. The apparatus of claim 22 wherein the Internet Protocol policy engine is arranged to determine if the at least one potential responder has taken ownership for providing the response and the virtual talk group creator is arranged to configure the virtual talk group to indicate that the at least one potential responder has taken ownership for providing the response.

25. The apparatus of claim 22 wherein the Internet Protocol policy engine is arranged to determine if the communications with the caller have been terminated, to reestablish the communications with the caller, and to recreate the virtual talk group to include the caller and the at least one potential responder after the communications with the caller are reestablished.

26. The apparatus of claim 22 wherein the at least one potential responder is one selected from the group including an enterprise emergency response team (ERT), mobile security personnel, and a loss prevention team (LPT).

* * * * *